US006396828B1

United States Patent
Liu

(10) Patent No.: US 6,396,828 B1
(45) Date of Patent: May 28, 2002

(54) ARRANGEMENT SYSTEM AND METHOD RELATING TO DATA NETWORK ACCESS

(75) Inventor: George Liu, Kista (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/041,506

(22) Filed: Mar. 12, 1998

(30) Foreign Application Priority Data

Mar. 13, 1997 (SE) ............................................... 9700895

(51) Int. Cl.[7] ............................................. H04L 12/66
(52) U.S. Cl. .......................... 370/352; 370/357; 370/355
(58) Field of Search ................................. 370/352, 353, 370/355, 356, 357, 359, 360, 362, 376, 465, 431

(56) References Cited

U.S. PATENT DOCUMENTS

| 5,606,580 A | * | 2/1997 | Mourot et al. | ............... 375/340 |
| 5,610,910 A | * | 3/1997 | Focsaneanu et al. | ......... 370/351 |
| 5,991,292 A | * | 11/1999 | Focsaneanu et al. | ......... 370/352 |
| 6,173,311 B1 | * | 1/2001 | Hassett et al. | ............... 709/202 |

FOREIGN PATENT DOCUMENTS

| EP | 0 697 798 | 2/1986 |
| EP | 0 642 283 | 3/1995 |
| EP | 0 789 499 | 8/1997 |
| WO | 94/05094 | 3/1994 |
| WO | 96/21983 | 7/1996 |

OTHER PUBLICATIONS

Hämälän, J., et al., "GSM Access to Internet." Telecommunications, pp. 37–42 (Mar. 1994).
Johnson, D., "Mobility Support in IPv6," Carnegie Mellon University, pp. i–8 (Nov. 26, 1996).
Perkins, C., "IP Mobility Support,"Network Working Group, pp. 1–12 (Oct. 1996).
Simpson, W., "The Point–to–Point Protocol (PPP)," pp. i–9 (Jul. 1994).

* cited by examiner

Primary Examiner—Wellington Chin
Assistant Examiner—Brenda Pham
(74) Attorney, Agent, or Firm—Burns, Doane, Swecker & Mathis, L.L.P.

(57) ABSTRACT

An arrangement for providing access between a telecommunications station and a data network. Access support devices are provided which are connected to a server via which a connection can be set-up between a telecommunication station and a data network. A telecommunication station registered with the access support devices can be in a connected mode in which the telecommunications station is connected to the server and an intermediate mode in which the telecommunications station is still registered with the access support devices but in which it is disconnected from the server. The telecommunication station is only connected when data actually is sent to/from the telecommunication station.

37 Claims, 6 Drawing Sheets

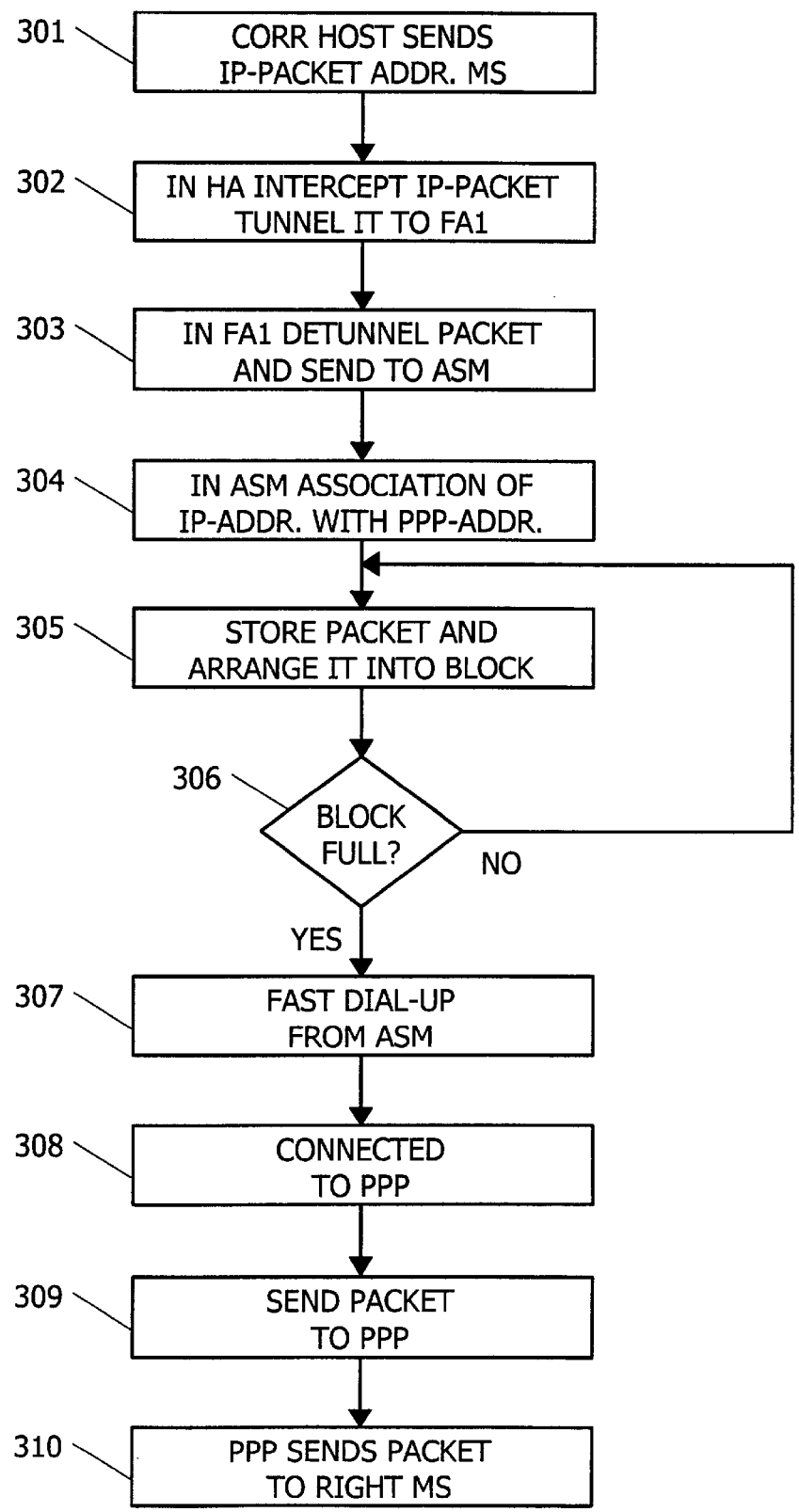

ARRANGEMENT SYSTEM AND METHOD RELATING TO DATA NETWORK ACCESS

BACKGROUND

The present invention relates to an arrangement for providing access between a telecommunications station in a telecommunications network and a data network. The invention also relates to access support means supporting access between a computer connected to a telecommunications station and a data network and to a communication system in which access is provided between mobile and/or fixed telecommunication stations and a data network. Still further the invention relates to a method of sending data between a personal computer connected to a telecommunications station and a data network such as for example Internet, intranets, corporate LAN:s or external public data networks etc. The use of data networks is increasing rapidly worldwide. In particular the continued exponential growth of the Internet has created needs for development of new protocols, techniques and products for accessing Internet, particularly via cellular mobile telecommunications networks.

In general subscribers of cellular mobile telecommunications networks as well as fixed subscribers need to be able to access different data networks such as for example Internet, corporate LANs (Local Area Network), intranets and external public data networks etc.

Basically three different ways of accessing data networks, such as intranets or Internet, from cellular mobile communication systems, such as for example GSM (Global System for Mobile Communications), are known.

One way relates to a packet switched data service which currently has been standardized for a later implementation in the GSM system. This is called the General Packet Radio Service (GPRS). This packet switched data service allows packet switched communications such as for example virtual circuit switched communication or IP (Internet Protocol) communication. GPRS is currently being standardized by the European Telecommunications Standards Institute (ETSI), but it is not yet in service.

Another way of accessing a data network is through the use of the Short Message Service (SMS). SMS provides a connection-less transfer of messages, the messages being stored and forwarded by an SMS-service center. The short messages are transported on the signalling links of the telecommunications system. However, the capacity is low (160 bytes in each message) and the time performance is also low. For example it takes about 3 seconds to reach the mobile from a SMS-service center. SMS is optimized for short messages and notifications and a more extended use of SMS for packet data applications would severely load the signalling links or the signalling networks of the cellular mobile communication system, such as for example GSM.

Still another way of accessing data networks from GSM relates to a new application solution intending to enhance the existing GSM data services, the so called "IP Direct Access" which is a type of GSM bearer services. This is a dial-up (mobile-originated only) circuit-switched service with TCP/IP (Transmission Control Protocol/Internet Protocol) based inter-networking. Direct Access means that the circuit-switched part of the GSM data call within the PLMN (Public Land Mobile Network) is not routed through a public ISDN (Integrated Services Digital Network) or PSTN (Public Switched Telecommunications Network) but instead it is terminated at a LAN (Local Area Network) or a WAN (Wide Area Network) for further transportation of data traffic to external data networks. Thus direct access is provided to servers in a LAN or in Internet.

However, it is a serious drawback that the "IP Direct Access" method only allows mobile-originated service, i.e. dial-up, or nothing. Another serious drawback with this method is that a connection will be used for the total duration of a session which means that the connection will be used also when no data actually is sent. This is a serious waste for the operator since radio resources are wasted. It is also a serious drawback for the user who has to pay for the duration of a call instead of for the data that has actually been sent, i.e. a charging method based on the volume of the sent data which would be very attractive for the customer. Still further the method provides for no mobility and roaming support between access points.

SUMMARY

What is needed is therefore an arrangement for providing access between a telecommunications station in a telecommunications network and a data network which enables a high capacity transfer of messages and which has a high time performance. An arrangement is also needed which enables data access for mobile as well as for fixed subscribers through which the radio resources are efficiently used and which is cost-efficient for the user. Still further an arrangement is needed which enables a mobile originated service as well as a mobile terminated service. Particularly an arrangement is needed which provides for mobility and roaming support between access points.

A communication system is also needed in which access between a subscriber station of a telecommunications network, a mobile station or a fixed station, and a data network is provided in which the radio resources are efficiently used and in which larger amounts of data can be sent with a high capacity and a high performance, and without loading the signalling links of the system. A communication system is also needed through which mobile originated services as well as mobile terminated services are enabled. Still further a communication system is needed in which mobility and roaming support between access points is provided.

A method of providing access between a mobile or a fixed telecommunications station and a data network is also needed through which the above mentioned objects are achieved.

An arrangement as referred to above is therefore provided which comprises access support means which are connected to a server, via which a connection can be set-up between a telecommunications station and a data network. When a telecommunications station is registered with the access support means, the access support means can switch the telecommunications station between a connected mode, in which the telecommunications station is connected to the server, and an intermediate, or a semi-connected, mode in which the telecommunications station is still registered with the access support means but in which it is disconnected from the server, in such a way that the telecommunications station only is in the connected mode when data actually is sent to/from the telecommunications station.

The server may e.g. be a so called point-to-point protocol server, PPP-server, which uses a point-to-point protocol (PPP) which relates to a standard method for transporting multi-protocol datagrams over point-to-point links. The point-to-point protocol is designed for simple links transporting packets between two peers, a peer being one of two ends of a point-to-point link. These links provide for full duplex, simultaneous bi-directional operation and they are assumed to deliver packets in order. PPP is a known solution intended to provide an easy connection of a large number of, and a wide variety of, hosts, bridges and routers. A router in this context is a node which forwards IP packets not explicitly addressed to the node itself and a host is any node which is not a router. These as well as other concepts, which will be further discussed below, are among others discussed in "IP Mobility Support", C. Perkins, editor IBM, October 1996, The Network Working Group, pages 1–12, "The point-to-point protocol (PPP)", W. Simpson, editor Daydreamer, July 1994, up to page 9 and "Mobility Support in IPv6", David B. Johnson, Carnegie Mellon University, Charles Perkins IBM Corporation, Nov. 26, 1996, up to page 8. These documents are herewith incorporated herein by reference.

In an advantageous embodiment the telecommunications station is automatically registered with the access support means when it is connected to the server, e.g. the PPP-server, i.e. when it is connected to the data network. In an alternative embodiment the telecommunications station is registered with the access support means through the user giving a command for registration with the access support means. According to one embodiment the length of the periods of semi-connection, i.e. the length of the periods spent in the intermediate mode, is preset or it can be given, e.g. in the command for semi-connection. Particularly the lengths of the semi-connection periods are adjustable, or can be varied in one way or another.

Advantageously the telecommunications station is registered with the access support means using its address, its telephone number and its identification. However, this can be done in different manners and it also depends on whether the telecommunications station is a fixed station or a mobile station.

In an advantageous embodiment the access support means switches the telecommunications station from the semi-connected mode, i.e. the intermediate mode, to the connected mode without requiring any action from the user or from the telecommunications station (or the data network), particularly without requiring the giving of any user identification or password etc.

If a registration request, which either may come from the telecommunications station or from an gent in a data network with which the telecommunications station is registered, is received in the access support means, the telecommunications station is advantageously switched to a disconnected mode.

According to an advantageous embodiment the access support means comprises storing means for storing data packets sent to/from a telecommunications station during the semi-connection mode, which packets are arranged in packet blocks of a given length, which blocks comprise a number of packets. The block length is advantageously adjustable depending on the system, the needs, the current circumstances etc. The data packets are sent to the telecommunications station blockwise during the connected mode and the radio resources are only used when the data is sent and the data is sent blockwise in any convenient manner.

In an advantageous embodiment, e.g. relating to Internet, the access support means sets up an association between the Internet Protocol IP-address in a foreign agent of the data network with which the telecommunications station is registered and the (point-to-point) server.

The Internet Protocol provides for a mobility supporting functionality. Therefore a mobile node has been introduced. A mobile node is a host or a router which changes its point of attachment from one network, or subnetwork, to another. A mobile node can change its location without changing its IP-address and it can continue to communicate with other internet nodes at any location using its "normal" IP-address. A home agent is a router on a mobile node's home network which tunnels packets for delivery to the mobile node when it is away from home, and maintains current location information for the mobile node.

A foreign agent is a router on a mobile node's visited network which provides routing services to the mobile node as long as it is registered. The foreign agent detunnels and delivers packets to the mobile node which were tunneled by the mobile node's home agent. For packets, or datagrams, sent by a mobile node, the foreign agent may serve as a default route for registered mobile nodes.

A mobile node is given a long term IP-address and a home network. The home address is administrated in the same way as a permanent IP-address is provided to a stationary host. When away from its home network, a care-of address is associated with the mobile node and reflects the current attachment point of the mobile node.

According to an advantageous embodiment of the invention, a terminal, i.e. a telecommunications station, which is handovered from another network, is registered in the access support means.

Advantageously a telecommunications station is switched into the connected mode and called up when needed by the access support means, for example when a block of packets is full.

In a particular embodiment the access support means control traffic to a telecommunications station from e.g. a foreign agent of the data network to the server, e.g. a PPP-server.

The data networks referred to in the application may for example be Internet, corporate local area networks LAN, an intranet or an external public data network or any other data network.

According to one embodiment the telecommunications station is a fixed station communicating with the (PPP-) server, for example over an ISDN-link or some other telephony link.

In another embodiment of the invention the telecommunications station comprises a mobile station of a mobile cellular communications system such as for example GSM. Other examples are ADC (American Digital Cellular), (D)-AMPS ((Digital)-Advanced Mobile Phone System), PDC (Pacific Digital Cellular) or any other cellular systems.

According to an advantageous embodiment location access means are provided which communicate with a home location register in which the mobile station is registered to provide the access support means with information about the current location of the mobile station.

Access support means are also provided which support access between a computer connected to a telecommunications station and a data network. The access support means are connected to a data network, for example via a server providing connection between the telecommunications station and the data network. The access support means further comprises means for registering a telecommunications station. A telecommunications station which is registered with the access support means is connected to the server only when data is sent to/from the telecommunications station, and, when no data traffic flows, the telecommunications station is switched to an intermediate mode in which it is disconnected from the server.

Advantageously the access support means comprises storing means for storing data packets into blocks of a desired length during the intermediate mode in which the fixed/mobile station is not connected to the server but merely registered with the access support means and data is sent to/from the telecommunications station in blocks, the length of the blocks preferably being adjustable. Advantageously a fast connection is established with the server without requiring any user identification etc. when it is time for sending a block with data, for example when the block is full or when the predefined time, if such limit has been set, for remaining in the intermediate mode has elapsed.

Particularly the access support means comprises a function block which is arranged between the server and mobility support agents provided in the data network or connected to the data network. Still further the access support means may be integrated with the server and/or mobility support agent(s).

Therefore also a communication system is provided in which access is provided between mobile and/or fixed telecommunications stations and a data network. Access support means are arranged between at least a number of servers providing communication between a number of telecommunications stations and the data network and mobility support agents provided in the system, which communicate with the respective servers. Alternatively the access support means are integrated with the server or with a mobility support agent. Still further the access support means, the server and the mobility support agent may all be integrated. Thus the functionality of the access support means can be implemented in different ways.

The access support means switch telecommunications stations registered with said access support means between a connected mode in which the telecommunications stations are connected to a server (e.g. a PPP-server) and an intermediate mode in which the telecommunications stations are registered with the access support means but in which they are disconnected from said server. The connected mode is only used when data is actually sent to/from said telecommunications stations. Particularly the sending is controlled in so far as data packets are received and arranged into blocks of data packets and the data is sent on from the access support means blockwise.

A method of sending data between a personal computer connected to a telecommunications station and a network, such as for example Internet, an intranet, external public data networks etc. is also provided which comprises the steps of; setting up a connection between a telecommunications station and the data network via a server, e.g. a PPP-server, registering the telecommunications station with access support means connected to or integrated with the server, switching the telecommunications station to an intermediate mode in which the telecommunications station remains registered with the access support means but in which it is disconnected from the server during sessions when no data traffic flows or while data is arranged in blocks of data packets in the access support means and, switching the telecommunications station to a connected mode in which it is connected to the server when data is sent. In this way the telecommunications station only is connected to the server when data actually is sent to or from the telecommunications station. Advantageously packetized data is stored into block in the access support means during the intermediate mode and data is only sent at given occassions or when a block is full. Advantageously the access support means switches the telecommunications station from the intermediate mode to the connected mode in a fast way without requiring any user identifying information or similar. According to different embodiments the telecommunications station is automatically registered with the access support means when it is switched on or alternatively a command has to be given to provide for registration with the access support means.

BRIEF DESCRIPTION OF THE DRAWINGS

The invention will in the following be further described in a non-limiting way under reference to the accompanying drawings in which:

FIG. 8 is a flow diagram corresponding to the embodiment of FIG. 6.

DETAILED DESCRIPTION

Figure 1:
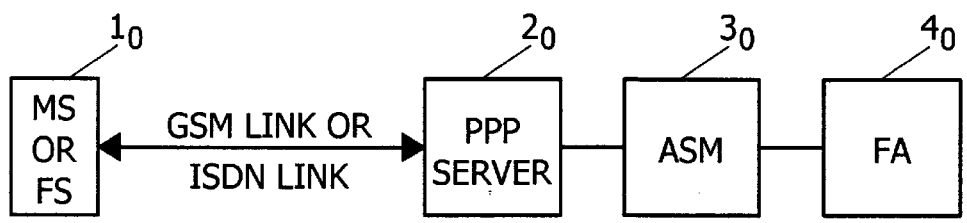
FIG. 1 shows a general implementation of the invention.

FIG. 1 shows a telecommunications station $1_0$, a mobile station or a fixed station, to which a personal computer is connected (not shown). Via communication links the telecommunications station $1_0$ communicates with a point-to-point protocol server PPP-server $2_0$ through which access is provided to the data network. As an alternative to a PPP-server e.g. some other connection oriented server may be used. The communication link is a cellular communication link, such as for example a GSM-link in case GSM is the cellular system used or an ISDN link or any other telephony link. To the PPP server $2_0$ access support means $3_0$ are connected, here also denoted ASM. Through the ASM $3_0$, which comprises a PPP access support agent, which is used in the network in cooperation with the mobile station or fixed station $1_0$ to provide for an intermediate mode, also called a semi-dial-up mode or a semi-connected mode, in which the telecommunications station $1_0$ is registered with the ASM $3_0$ but disconnected from the PPP server $2_0$. Advantageously the access support means $3_0$ are arranged between the PPP server $2_0$ and a foreign agent (FA) $4_0$ of the data network or connected to the data network. The functionality of the ASM $3_0$ can, instead of being implemented separately, be integrated with the server and/or the FA.

Figure 2:
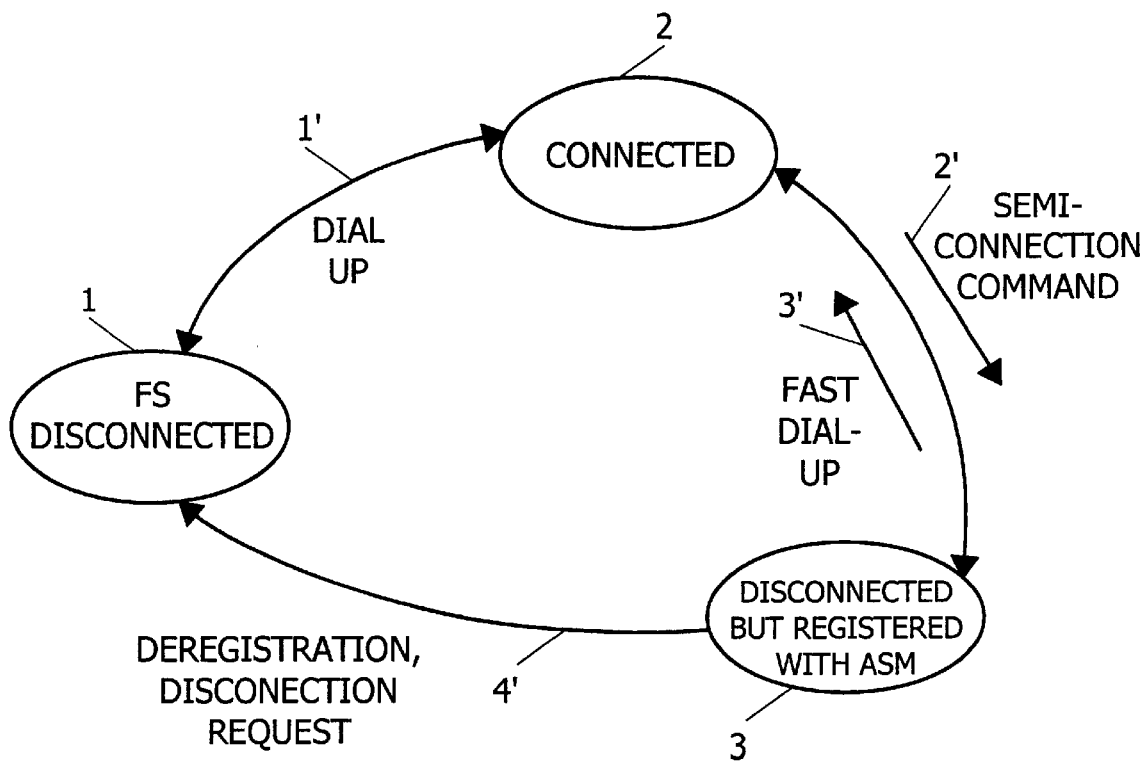
FIG. 2 illustrates a fixed telecommunications station in the different modes.

In FIG. 2 the functioning of the invention as provided for through the introduction of the access support means is illustrated for a telecommunications station in the form of a fixed station. The fixed station (FS) is supposed to be in its disconnected state, or in the disconnected mode. As a user dials up the PPP server, 1', a connection is set-up with a data network such as for example Internet. The fixed station then enters the connected mode 2 or the dial-up mode. The dial-up 1' e.g. means that the user of the fixed station dials a telephone number to the PPP server. The fixed station, according to different embodiments, automatically registers with the access support means ASM for entering the semi-connected mode or for semi-dial-up service by issuing a semi-dial-up registration command or an intermediate mode registration command. Alternatively the user actively registers to the ASM for entering the intermediate mode or to access the semi-dial-up service, 2'. The fixed station then enters the intermediate mode, or the semi-connected mode 3. The length of the semi-connected mode can according to one embodiment be specified in the semi-connection registration command. Alternatively no length is given or it is given separately. In the intermediate mode or the semi-connected mode 3 the fixed station is not connected to the PPP server but it remains registered with the access support means. For example it is registered with the access support means with its telephone number with the commitment that the fixed station may dial-up again using so called fast dial-up 3' or that the access support means will call back, also denoted fast call back or dial-up; also illustrated through the arrow 3' in the figure, if necessary. The fast dial-up/call back 3' is only possible from the intermediate, or the semi-connected, mode 3 to the connected mode 2 as is illustrated through the figure. Advantageously, since the user has already registered with the access support means, no action is required by the user.

If the fixed station or the foreign agent as discussed with reference to FIG. 1, issues a deregistration request 4', the fixed station is disconnected 1.

Figure 3:
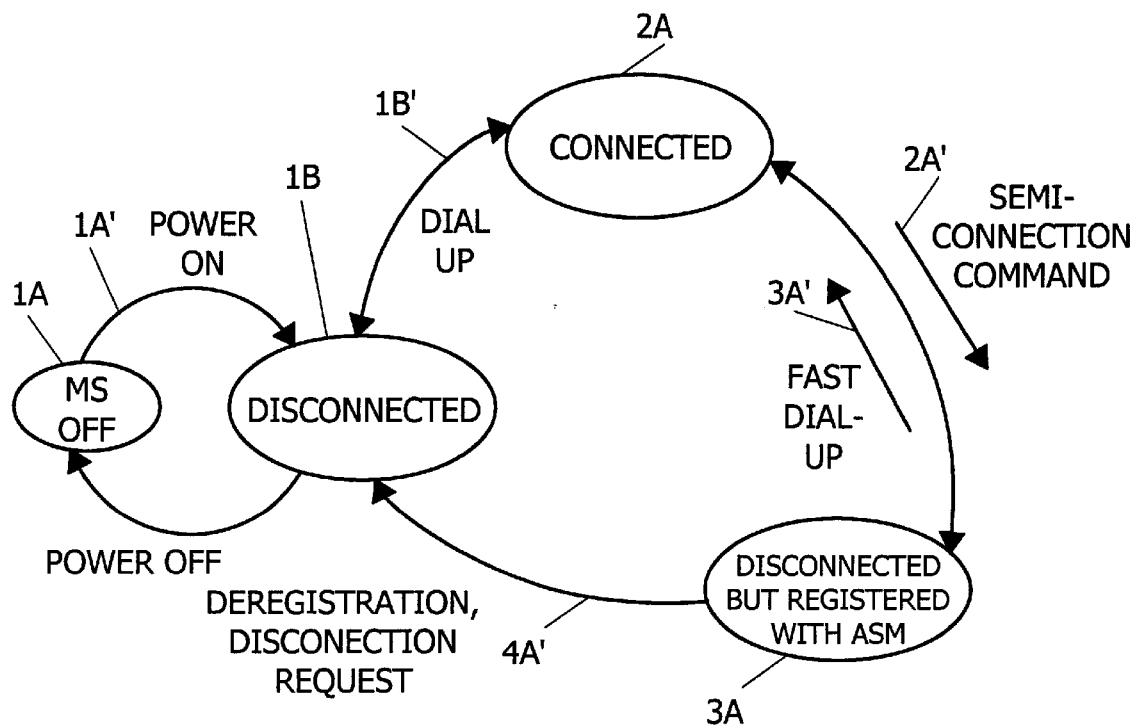
FIG. 3 shows a mobile station being switched between three different modes.

In FIG. 3 an embodiment is illustrated which is similar to that of FIG. 2, but with the difference that the telecommunications station is a mobile station MS. The mobile station is first supposed to be in an off state, 1A. When it is activated, i.e. power on 1A', it enters the disconnected mode 1B. The user of the mobile station 1A then dials-up the PPP server and sets up a connection with the data network, for example Internet, 1B', and the mobile station enters the connected mode 2A. As in the embodiment discussed with reference to FIG. 2, the mobile station automatically, or through a user action, registers with the ASM for semi-connection service or semi-dial-up service through the issuance of a semi-connection command 2A'. The mobile station then enters the semi-connected mode 3A'. As above the length of the period of the semi-connected mode can be given in the semi-connection command, 2A', or it is not specified at all, or it can be provided for in any other manner. In the semi-connected mode 3A, the mobile station is not connected to the PPP server but it is registered with the ASM e.g. with its address, telephone number and identification with the commitment that the terminal may dial-up again, fast dial-up 3A' or the ASM may call back, a fast call-back or fast dial-up 3A', if, or when, needed.

Also in this embodiment the dial-up/call back is only possible from the semi-connected mode 3A to the connected mode 2A in which the user identification and password etc. advantageously do not have to be checked since the user is already registered with ASM.

If the mobile station, or the foreign agent, issues a deregistration request, 4A', the mobile station is deregistered from the ASM and disconnected from the PPP.

Figure 4:
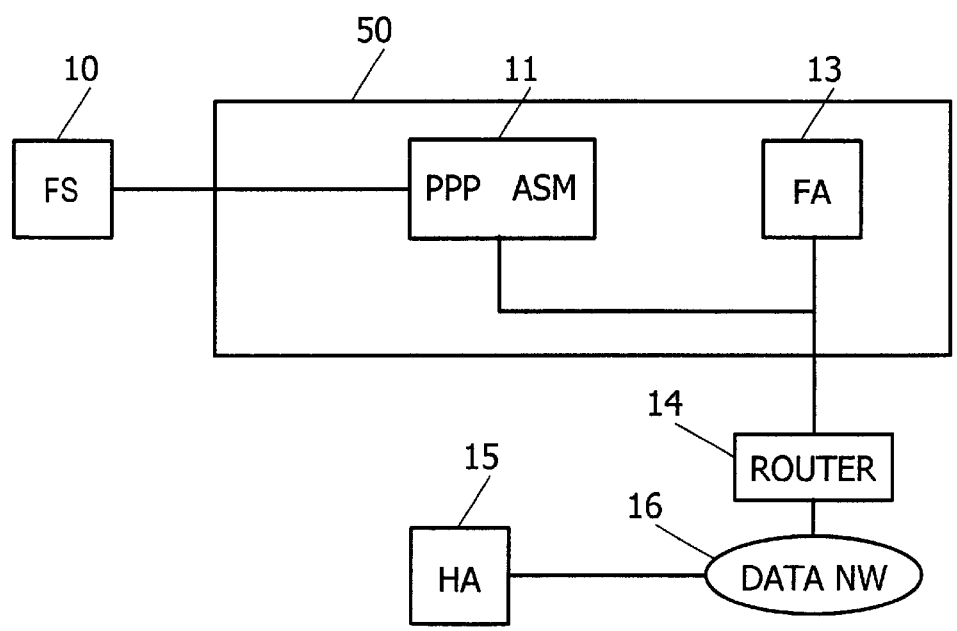
FIG. 4 schematically illustrates a fixed station accessing a data network.

In FIG. 4 an embodiment is shown in which the telecommunications station is a fixed station FS 10. The PPP server, the access support means ASM 11 and the foreign agent (FA) 13 can be said to form a mobility support node 50. In this case the PPP-server and the access support means are implemented in an integrated form 11. In an alternative embodiment (not shown) the FA 13 could also have been integrated with the PPP-server and the ASM. The mobility support node 50 is connected to a router 14 which in turn connects to the data network 16, which comprises, or is connected to a home agent (HA) 15. As also mentioned earlier in the application, a home agent is a router on a mobile nodes home network which tunnels datagrams or data packets for delivery to the mobile node when the user is away from home and it maintains the current location information for the mobile node. The access support means comprises a function block between (here integrated with) the PPP server 11 and the mobility support agents, i.e. foreign agents, home agents. Also in this case the PPP-server and the ASM could have been implemented in a separate form.

Figure 5:
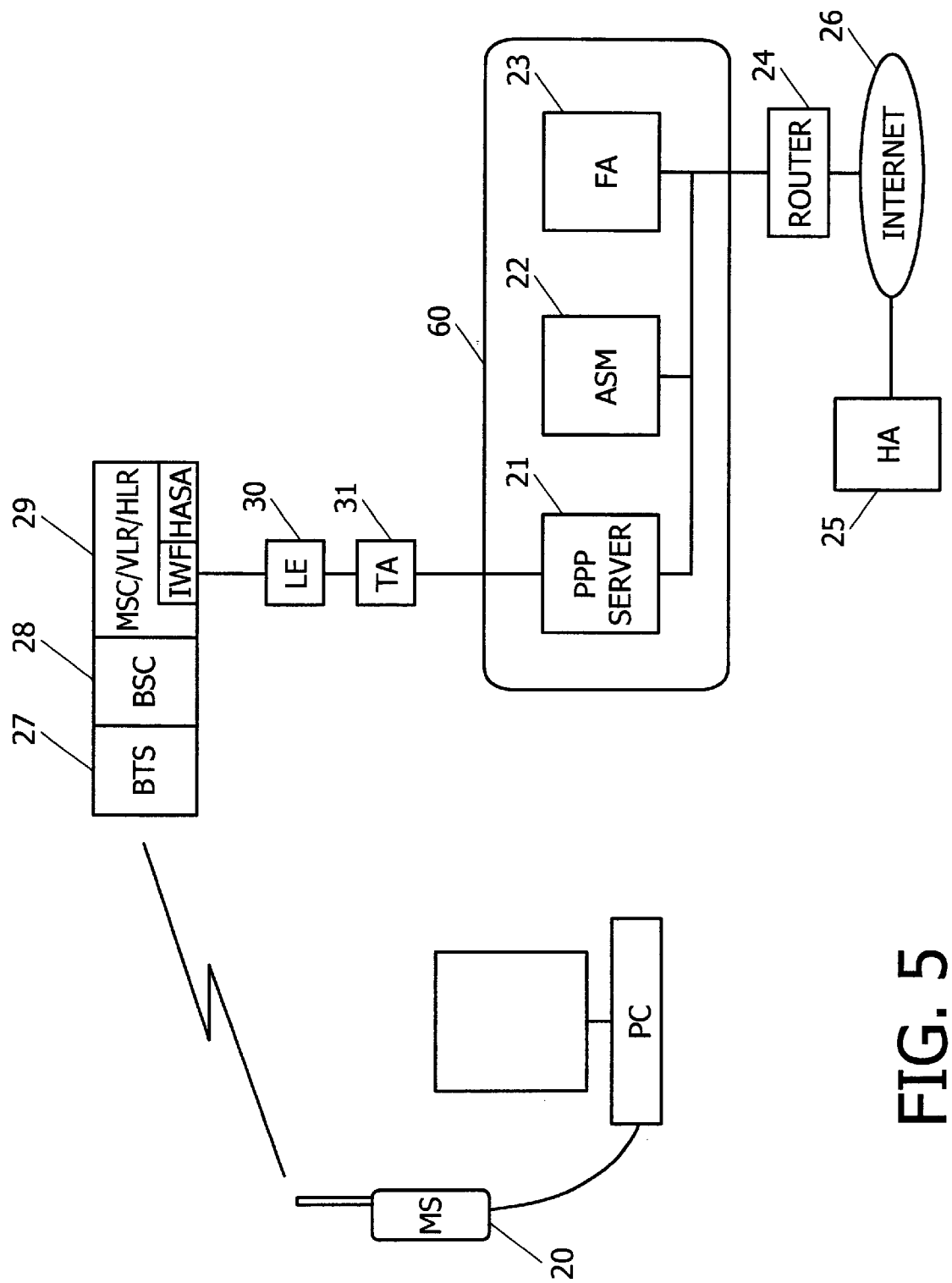
FIG. 5 schematically illustrates a mobile station accessing a data network.

FIG. 5 relates to an embodiment in which the telecommunications station comprises a mobile station MS 20 to which a PC is connected. The mobile station 20 communicates with a base transceiver station (BTS) 27 which in turn is connected to a base station controller (BSC) 28 communicating with mobile switching centres/visitor location registers (MSC/VLR) and the mobile station 20 is registered with the home location register (HLR) in a conventional manner. In this figure MSC/VLR, HLR etc. are only schematically indicated as a block 29. This is only intended to very schematically illustrate a cellular mobile communication system and it will not be further described herein since it is known per se. This particularly relates to the GSM system; in other cellular communication system such as for example ADC (American Digital Communication System) the base station is not split up into a base transceiver station and a base station controller as is also well known per se.

In this case the block 29 is illustrated as including an interworking function (IWF) which has the functionality of interworking protocols which also is known per se, for example from the field of intelligent networks. In FIG. 5 the mobility support node 60 comprises a PPP server 21, access support means 22 (or a PPP access support agent) and a foreign agent (FA) 23. PPP-server, ASM and FA are here implemented separately. In alternative embodiments the ASM could have been integrated with either of the PPP-server and the FA, or both.

The mobility support node 60 also here comprises a HLR access support agent (HASA) which is a function block located close to the home location register (HLR) to assist the ASM 22 in getting location information about the mobile station 20. The function of the HLR access support agent (HASA) is to get the location information of a mobile and send it to the ASM 22 if this is required. As referred to above the ASM 22 comprises a function block between the PPP server 21 and the mobility support agents 23,25. The ASM 22, as referred to above, sets up the semi-connected mode or the intermediate mode for the mobile station 20. This may be done automatically, e.g. if it is introduced as a service that automatically is provided for, or it may be done in response to a request by the mobile station 20. Furthermore, advantageously, the ASM 22 sets up an association between the data network address (if the data network for example is Internet, the so called IP-address) in the foreign agent 23 and the PPP 21.

Advantageously the ASM 22 provides for registering the intermediate mode of a terminal if it is handovered from another network or from another PLMN.

Further, in the ASM 22 storing means are provided for storing packets sent to the mobile station 20 and arranging them in blocks (particularly so called TCP segments, Transmission Control Protocol segments) during the intermediate mode. Furthermore the ASM 22 finds and calls up the terminals, e.g. mobile station 20, which are registered in their intermediate mode if this is necessary, e.g. if a block is full. The ASM 22 sends the packets to the terminal, e.g. mobile station 20, blockwise; a block is much larger than a packet and thus comprises a number of packets. The block size may be adjustable, not an each packet. Furthermore the ASM 22 controls mobile terminated traffic from the foreign agent 23 to the PPP server 21.

In an advantageous embodiment the ASM 22 further filters out the agent advertisement information sent by the foreign agent 23. The agent advertisement information comprise messages constructed by attaching special extensions to a router advertisement message.

Figure 6:
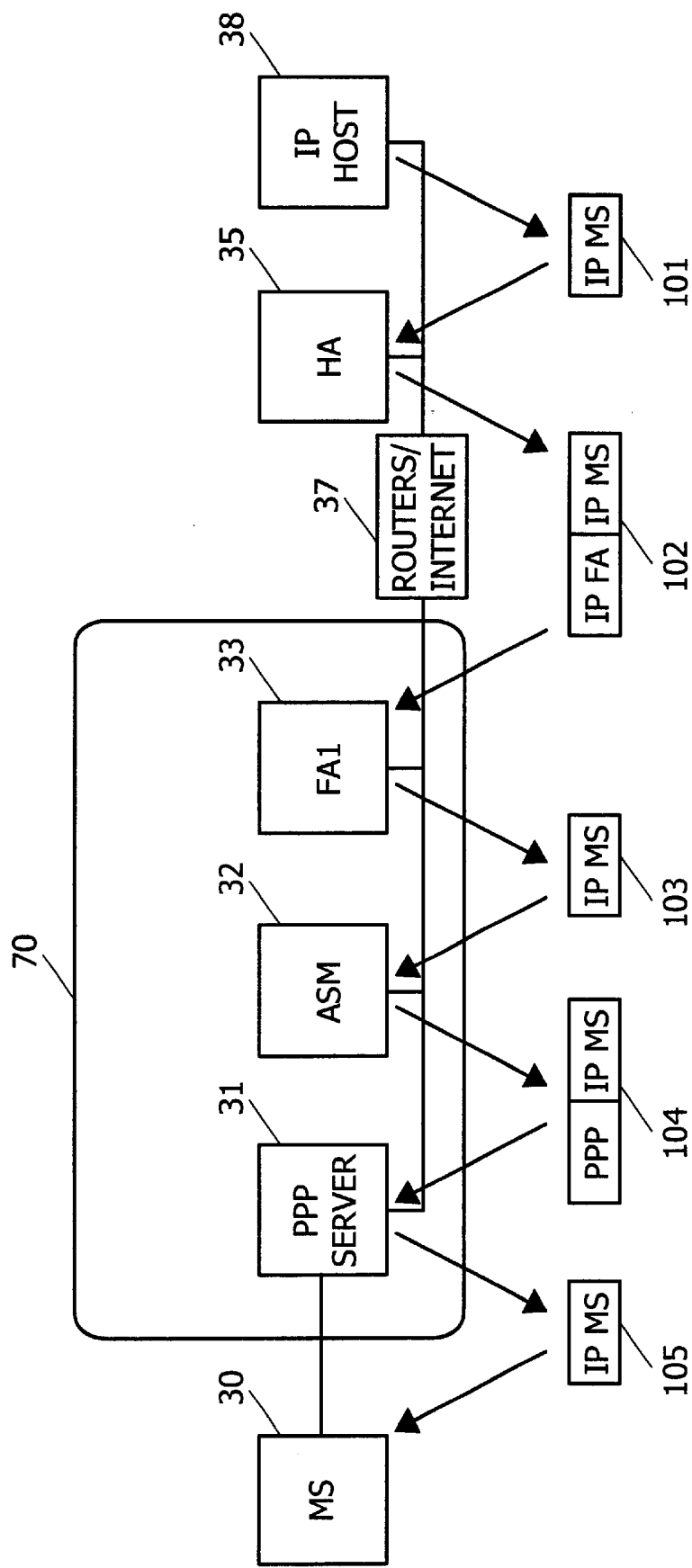
FIG. 6 illustrates the sending of a packet to a mobile station which is not in the home network.

In FIG. 6 an embodiment is shown in which a packet flows to a mobile station 30 which is not in its home network. The mobile station is connected to the PPP server 31 over a communication link, for example in the case of a GSM system, a GSM link, e.g. a direct access link, or an ISDN-link or any other appropriate link. Furthermore it is supposed that the mobile station 30 is registered with the access support means ASM (also called a PPP access support agent) 32 and that it is in the intermediate mode, i.e. the semi-connected mode in which it is registered with the access support means 32 but disconnected from the PPP server 31. The access support means 32 registers the mobile station 30 through the foreign agent (FA) 33 to the home agent (HA) 35 of the mobile station 30. It is now supposed that a packet is sent from a correspondent host 38 to the mobile station 30, i.e. the correspondent host (IP host) is the originator of the packet. A correspondent host comprises a correspondent node which is a peer with which a mobile node is communicating. The correspondent host, or node, may be mobile as well as stationary. Particularly the correspondent host is a node which is not a router.

The PPP-server 31 ASM 32 and FA1 33 can here be said to form a mobility support node 70. In the embodiment illustrated in FIG. 6 the IP host 38 sends a standard packet 101, here a standard IP packet, to the mobile station 30 using the home address of the mobile station 30, which is the same as in the mobile-IP (e.g. mobile Internet Protocol version 4 or version 6).

The home agent (HA) 35 knows that a mobile station 30 is registered at the foreign agent (FA) 33 and the packet, e.g. a datagram, is intercepted by the home agent 35 into an intercepted packet 102 which via routers 37, e.g. of Internet, is tunnelled to the care-of address (FA1) in the foreign agent 33. The packet 102 is then detunnelled by the foreign agent 33 and sent to the access support means 32. In the access support means 32 the IP-address is associated with the PPP address link, telephone number, location information for example as provided through the HLR access support agent as discussed with reference to FIG. 5. It is supposed that the mobile station 30 is in the semi-connected mode for the registration with the access support means 32. In the access support means 32 the packets are stored and arranged into blocks as discussed earlier in the application. If a block is full, the terminal is called up via fast dial-up as also discussed earlier in the application without requiring any action of the user, giving of identification information etc. and the mobile station 30 is then connected to the PPP server 31 and the access support means 32 send packets blockwise to the PPP server 31. The PPP server 31 then sends the packets in a conventional manner through the connection link to the appropriate mobile station, in this case mobile station 30. The functions in each functional block as described above can be traded each other depending on the particular implementation constraints. This means that the functionalities can be implemented separately or integrated as discussed earlier in the application.

Figure 7:
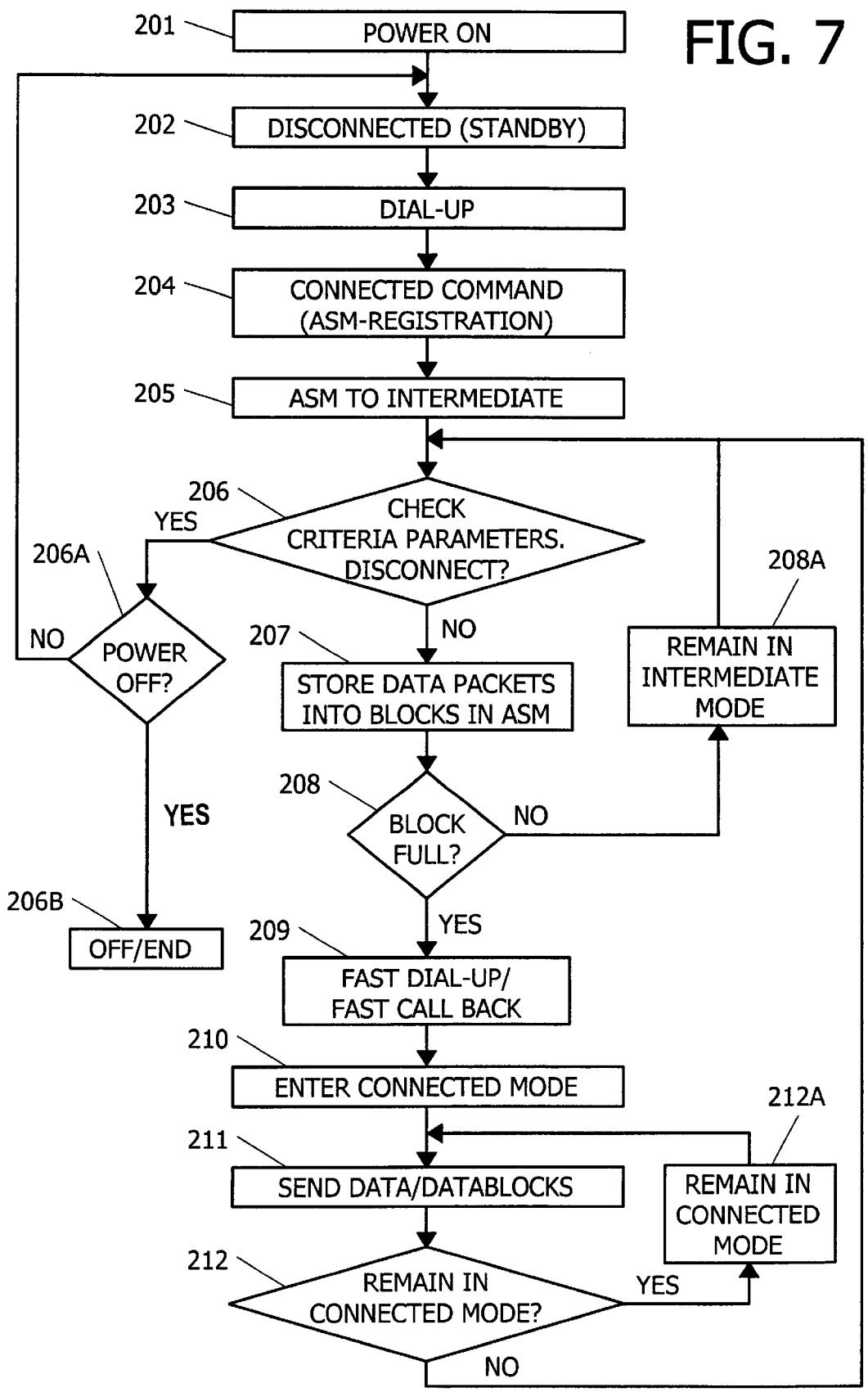
FIG. 7 is a flow diagram illustrating the access between a mobile station and a data network.

In FIG. 7 a flow diagram is illustrated referring to access between a mobile station and a data network.

This is in principle a description of the functioning as referred with reference to FIG. 4.

A mobile station is activated, power on, 201. The mobile station then enters a disconnected or a stand-by mode, 202. The user then dials up the data network, 203. It is supposed that a command is dispatched requiring ASM registration, i.e. registration with the access support means, 204. The mobile station is then switched to the intermediate mode, or ASM goes to the intermediate mode, 205, in which the mobile station remains registered with the access support means but in which it is disconnected from the data network, 205. A number of criteria parameters are then checked to see if a disconnection is due, e.g. time-out, end of ASM-period, change of location etc, 206. If any of the given criteria are met, power off, 206A, is checked. If yes, the mobile station is in power off state, 206B, otherwise, the procedure is repeated from 202 etc. However, if the criteria for disconnection are not met, data packets are stored into blocks in ASM, 207. Checks are done to establish whether a block is full, 208. If not, it will remain in the intermediate mode, 208A, and the disconnect criteria parameters are checked, 206, etc. If however a block is full, the mobile station is called using fast dial-up/fast call-back, 209. The connected mode is then entered, 210, and the data/datablocks are sent, 211. Then it is checked whether to remain in connected mode, 212. E.g. it is established whether time is out, end of ASM-period, change of location etc., 212. If yes, the connected mode is maintained, 212A, and the sending of data/datablocks continues, 211. If not, the disconnect criteria are checked, 206.

FIG. 8 is a flow diagram illustrating the sending of a packet to a mobile station which is not in its home network as also described with reference to FIG. 6.

It is supposed that a correspondent host sends an IP-packet to the mobile station using the home IP-address of the MS, 301. In the home agent the IP-packet is intercepted and tunneled to the foreign agent which keeps information about the care-of address FA1, 302. The foreign agent detunnels the packet and sends it to the access support means, 303. In the access support means the IP-address of the mobile station is associated with the address of the PPP server, 304. In the access support means the packet is stored and arranged into a block together with a number of other packets, 305. Then it is established whether the block is full, 306. If it is not yet full, the procedure of storing arriving packets and arranging them into blocks, 305, is continued until a block is full. Then the access support means provides for a fast dial-up, 307, whereupon the mobile station is connected to the PPP of the data network, 308. The packet is then sent to the PPP, 309, which sends it on to the appropriate mobile station, 310.

It is an advantage of the invention that it supports mobile originated as well as mobile terminated data services. Another advantage is that through the invention radio resources as well as costs can be saved both for the operators and for the user or subscriber. Another advantage is that it supports terminal mobility with the data network, particularly Internet, access.

It is also an advantage of the invention that it is compatible with the Internet Protocol version 4 and version 6. Still further it offers a faster call set-up and response time than hitherto known method using analogue modems (for both mobile originated and mobile terminated traffic).

The invention is of course not limited to the shown embodiment but can be varied in a number of ways without departing from the scope of the claims.

What is claimed is:

1. An arrangement providing access between a telecommunications station of a telecommunications network and a data network, comprising a server for setting up a connection between the telecommunications station and the data network, access support means connected to the server for switching a telecommunication station registered with said access support means between a connected mode in which the telecommunication station is connected to the server and a semi-connected mode in which the telecommunication station is registered with the access support means and disconnected from the server, wherein while in the semi-connected mode, packetized data destined for the telecommunication station is stored in multi-packet blocks in a storage associated with the access support means and when each of the multi-packet blocks reaches a given capacity, the telecommunication station is called, the connection mode is entered, and the block of packetized data is sent to the telecommunication station.

2. The arrangement of claim 1, wherein the telecommunication station automatically is registered with the access support means when it is connected to the data network.

3. The arrangement of claim 1, wherein the telecommunication station is registered with the access support means through the user giving a command for access support means registration.

4. The arrangement of claim 1, wherein a length of each period of semi-connection is given.

5. The arrangement of claim 1, wherein the telecommunication station is registered with the access support means with one or more of its address, its telephone number and its identification.

6. The arrangement of claim 1, wherein the access support means switches the telecommunication station from the semi-connected mode to the connected mode without requiring any action from the user.

7. The arrangement of claim 1, wherein the telecommunication station is switched to a disconnected mode if a deregistration request is received in the access support means either from the telecommunication station or from an agent of the data network with which the telecommunication station is registered.

8. The arrangement of claim 1, wherein a length of each block is adjustable.

9. The arrangement of claim 1, wherein the access support means sets up an association between an IP-address in a foreign agent of the data network with which the telecommunication station is registered and the server.

10. The arrangement of claim 9, wherein a terminal handed over from another network is registered in the access support means.

11. The arrangement of claim 1, wherein a terminal handed over from another network is registered in the access support means.

12. The arrangement of claim 9, wherein the access support means control traffic to a telecommunication station from a foreign agent of the data network to the server.

13. The arrangement of claim 12, wherein the data network is at least one of the Internet, a LAN, an intranet and an external public data network.

14. The arrangement of claim 1, wherein the telecommunication station is a fixed station communicating with the server which server supports a point-to-point communication protocol.

15. The arrangement of claim 12, wherein the telecommunication station is a fixed station communicating with the server which server supports a point-to-point communication protocol.

16. The arrangement of claim 1, wherein the telecommunication station comprises a mobile station of a mobile cellular communications system.

17. The arrangement of claim 12, wherein the telecommunication station comprises a mobile station of a mobile cellular communications system.

18. The arrangement of claim 14, wherein location access means are provided for communicating with a home location register in which the mobile station is registered to provide the access support means with information about a current location of the mobile station.

19. The arrangement of claim 1, wherein the access support means are integrated with at least one of the server and a mobility support agent.

20. The arrangement of claim 15, wherein the access support means are integrated with at least one of the server and a mobility support agent.

21. The arrangement of claim 8, wherein the server supports a point-to-point communication protocol.

22. The arrangement of claim 1, wherein the given capacity reached for each block is a full length of the block.

23. An access support device for supporting access between a computer connected to a telecommunication station and a data network, wherein the access support device is connected to a server providing connection between the telecommunication station and the data network, and further comprises means for registering a telecommunication station, a telecommunication station registered with said access support device being connected to the server only when data is sent to/from the telecommunication station, and, when no data traffic flows, the telecommunication station is switched to an intermediate mode in which it is disconnected from the server, wherein while in the intermediate mode, packetized data destined for the telecommunication station is stored in multi-packet blocks in a storage associated with the access support means and when each of the multi-packet blocks reaches a given capacity, the telecommunication station is called, the connection mode is entered, and the block of packetized data is sent to the telecommunication station.

24. The access support device of claim 23, wherein a length of the blocks is adjustable.

25. The access support device of claim 23, wherein a fast connection is established with the server without requiring any user identification.

26. The access support device of claim 25, comprising a function block arranged between, or integrated with, the server and mobility support agents of the data network or connected to the data network.

27. The access support device of claim 23, wherein the given capacity reached for each block is a full length of the block.

28. A communications system in which access is provided between mobile and/or fixed telecommunication stations and a data network, the telecommunication station(s) communicating over connection links with a server for connection set-ups, wherein access support means are arranged between or integrated with at least a number of servers and mobility support agents communicating with respective servers, said access support means switching telecommunication stations registered with said access support means between a connected mode in which the telecommunication stations are connected to a server and an intermediate mode in which the telecommunication stations are registered with said access support means but disconnected from said server, the connected mode being used only when data is sent to/from said telecommunication station(s), wherein while in the intermediate mode, packetized data destined for the telecommunication station is stored in multi-packet blocks in a storage associated with the access support means and when each of the multi-packet blocks reaches a given capacity, the telecommunication station is called, the connection mode is entered, and the block of packetized data is sent to the telecommunication station.

29. The communication system of claim 28, wherein the given capacity reached for each block is a full length of the block.

30. The communication system of claim 28, wherein a length of each block is adjustable.

31. A method of sending data between a computer connected to a telecommunication station and a data network, comprising the steps of:

setting up a connection between the telecommunication station and the data network via a server, registering the telecommunication station with access support means connected to the server, switching the telecommunication station to an intermediate mode in which the telecommunication station remains registered with the access support means but is disconnected from the server during sessions when no data traffic flows, storing packetized data destined for the telecommunication station in multi-packet blocks in a storage associated with the access support means, when each of the multi-packet blocks reaches a given capacity, calling, the telecommunication station switching the telecommunication station to a connection mode in which it is connected to the server, and sending the block of packetized data to the telecommunication station, or else, switching the telecommunication station to the connected mode when data traffic flows, so that the telecommunication station only is connected to the server when data is actually sent to/from the telecommunication station.

32. The method of claim 31, wherein the switching from the intermediate mode to the connected mode is done without requiring any user identifying information.

33. The method of claim 31, further comprising the step of:

automatically registering the telecommunication station with the access support means.

34. The method of claim 31, further comprising the step of:

giving a command to enable registration with the access support means.

35. The method of claim 31, comprising the step of:

setting up an association between an IP-address in a foreign agent of the data network and the server, the server being a PPP-server.

36. The method of claim 31, wherein the given capacity reached for each block is a full length of the block.

37. The method of claim 31, wherein a length of each block is adjustable.

* * * * *